United States Patent
Hsieh et al.

(10) Patent No.: US 10,802,830 B2
(45) Date of Patent: Oct. 13, 2020

(54) IMPRECISE REGISTER DEPENDENCY TRACKING

(71) Applicant: International Business Machines Corporation, Armonk, NY (US)

(72) Inventors: Jonathan Hsieh, Poughkeepsie, NY (US); Gregory William Alexander, Pflugerville, TX (US); Tu-An Nguyen, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/292,933

(22) Filed: Mar. 5, 2019

(65) Prior Publication Data

US 2020/0285478 A1 Sep. 10, 2020

(51) Int. Cl.
*G06F 9/38* (2018.01)
*G06F 9/30* (2018.01)

(52) U.S. Cl.
CPC ........ *G06F 9/3838* (2013.01); *G06F 9/30123* (2013.01)

(58) Field of Classification Search
None
See application file for complete search history.

(56) References Cited

U.S. PATENT DOCUMENTS

| | | | | |
|---|---|---|---|---|
| 5,579,504 A * | 11/1996 | Callander | ........... | G06F 12/0808 711/121 |
| 6,044,478 A * | 3/2000 | Green | ........... | G06F 12/0815 711/141 |
| 6,546,462 B1 * | 4/2003 | Palanca | ........... | G06F 12/0804 711/135 |
| 7,015,718 B2 * | 3/2006 | Burky | ........... | G06F 9/3836 326/40 |
| 7,660,971 B2 * | 2/2010 | Agarwal | ........... | G06F 9/3842 712/217 |
| 7,689,812 B2 * | 3/2010 | Abernathy | ........... | G06F 9/3802 712/216 |
| 7,711,929 B2 | 5/2010 | Burky et al. | | |
| 8,245,018 B2 * | 8/2012 | Nguyen | ........... | G06F 9/3863 712/244 |
| 9,489,207 B2 * | 11/2016 | Burky | ........... | G06F 9/3851 |

(Continued)

*Primary Examiner* — Eric Coleman
(74) *Attorney, Agent, or Firm* — Cantor Colburn LLP; William Kinnaman

(57) ABSTRACT

A computer data processing system includes a plurality of logical registers, each including multiple storage sections. A processor writes data a storage section based on a dispatched first instruction, and sets a valid bit corresponding to the storage section that receives the data. In response to each subsequent instruction, the processor sets an evictor valid bit indicating a subsequent instruction has written new data to a storage section written by the first instruction, and updates the valid bit to indicate the storage section containing the new written data. A register combination unit generates a combined evictor tag to identify a most recent subsequent instruction. The processor determines the most recent subsequent instruction based on the combined evictor tag in response to a flush event, and unsets all the evictor tag valid bits set by the most the most recent subsequent instruction along with all previous subsequent instructions.

18 Claims, 9 Drawing Sheets

(56) References Cited

U.S. PATENT DOCUMENTS

| | | |
|---|---|---|
| 2006/0168393 A1 | 7/2006 | Christensen et al. |
| 2011/0153986 A1* | 6/2011 | Alexander .............. G06F 9/383 |
| | | 712/205 |
| 2016/0283236 A1* | 9/2016 | Genden ............... G06F 9/30105 |
| 2017/0046164 A1 | 2/2017 | Madhavan et al. |
| 2017/0109093 A1* | 4/2017 | Chu .................... G06F 9/30036 |
| 2017/0109166 A1* | 4/2017 | Eisen ................... G06F 9/3891 |
| 2017/0109167 A1* | 4/2017 | Eisen ................... G06F 9/3859 |
| 2018/0081691 A1 | 3/2018 | Kulkarni et al. |

* cited by examiner

IMPRECISE REGISTER DEPENDENCY TRACKING

BACKGROUND

The present invention relates generally to the field of instruction processing and more particularly to out-of-order superscalar multi-threaded microprocessor systems.

Out-of-order computing architectures implement a processor that executes instructions in an order governed by the availability of input data and execution units rather than by their original order in a program. In doing so, the processor can avoid idle times (often referred to as stalls) while waiting for the preceding instruction to complete and can, in the meantime, can process the next instructions that are able to run immediately and independently.

SUMMARY

According to an embodiment described herein, a computer data processing system includes a plurality of logical registers (LREGs), where each LREG includes a plurality of individual storage sections. A processor is configured to write data to at least one of the individual storage sections of at least one of the LREGs based on a dispatched first instruction, and to set at least one valid bit corresponding to at least one of the individual storage sections that receives the data. The processor detects a subsequent instruction, and in response to each subsequent instruction, sets at least one evictor valid bit indicating a subsequent instruction has written new data to at least one of the individual storage sections of at least one of the LREGs written by the first instruction, and updates the at least one valid bit to indicate the at least one of the individual storage section containing the new written data. An LREG combination unit is configured to generate a combined evictor tag (ETAG) to identify a most recent subsequent instruction among the plurality of subsequent instructions. The processor determines the most recent subsequent instruction based on the combined ETAG in response to a flush event, and unsets all the ETAG valid bits set by the most the most recent subsequent instruction along with all previous subsequent instructions.

According to another non-limiting embodiment, a computer-implemented method is provided for tacking dependencies of entries in an issue queue. The method comprises establishing a plurality of logical registers (LREGs), where each LREG including a plurality of individual storage sections. The method further comprises writing data to at least one of the individual storage sections of at least one of the LREGs based on a dispatched first instruction, setting at least one valid bit corresponding to at least one of the individual storage sections that receives the data, and dispatching a plurality of subsequent instructions after the first instruction. The method further comprises in response to dispatching each subsequent instruction, setting at least one evictor valid bit indicating a subsequent instruction has written new data to at least one of the individual storage sections of at least one of the LREGs written by the first instruction, and updating the at least one valid bit to indicate the at least one of the individual storage section containing the new written data. The method further comprises generating a combined evictor tag (ETAG) to identify a most recent subsequent instruction among the plurality of subsequent instructions, and in response to a flush event, determining the most recent subsequent instruction based at least in part on the combined ETAG, and unsetting all the ETAG valid bits set by the most the most recent subsequent instruction along with all previous subsequent instructions.

According to yet another non-limiting embodiment, a computer program product is provided to control a computing system to track dependencies of entries in an issue queue. The computer program product comprises a computer readable storage medium having program instructions embodied therewith. The program instructions are executable by an electronic computer processor to control the computing system to perform operations comprising establishing a plurality of logical registers (LREGs), where each LREG includes a plurality of individual storage sections. The operations further comprise writing data to at least one of the individual storage sections of at least one of the LREGs based on a dispatched first instruction, setting at least one valid bit corresponding to at least one of the individual storage sections that receives the data, and dispatching a plurality of subsequent instructions after the first instruction. In response to dispatching each subsequent instruction, the program instructions control the computing system to set at least one evictor valid bit indicating a subsequent instruction has written new data to at least one of the individual storage sections of at least one of the LREGs written by the first instruction, and to update the at least one valid bit to indicate the at least one of the individual storage section that contains the new written data. The program instructions control the computing system to generate a combined evictor tag (ETAG) to identify a most recent subsequent instruction among the plurality of subsequent instructions. In response to a flush event, the program instructions control the computing system to determine the most recent subsequent instruction based at least in part on the combined ETAG, and unset all the ETAG valid bits set by the most the most recent subsequent instruction along with all previous subsequent instructions Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

A processor capable of issuing instructions out-of-order must operate to ensure that younger instructions do not issue before the older instructions that produce register contents used by those younger instructions. These register contents are sometimes referred to as logical registers (LREGs). Moreover, these LREGs can be architecturally separated into multiple storage sections, e.g., a "hi" half and a "lo" half. This requirement is referred to as creating a dependency between the younger instruction and its sources.

Traditional out-of-order processors will issue an instruction when the issue queue position is ready to handle all of the instruction's dependencies. Therefore the dependencies created for the sources (i.e. the older instructions) must be specified as the issue queue position. The structure that creates these dependencies must account for all the register sources of the instruction, including the separate architected hi and lo halves for each register.

In addition, pipeline flushes must update the structure so that the youngest surviving writer (sometimes referred to as an evictor) of a register (or register half) can always be tracked. In the presence of new writers dispatching and younger writers (i.e., evictors) being flushed, the youngest evictor needs to be updated.

Various non-limiting embodiments described herein provides a data processing system uses a single combined LREG number to identify the group of individual LREGs that are written to by a most recent dispatched instruction. In at least one non-limiting embodiment, the combined LREG number includes a first hash that determines a group of LREGs (e.g., LREG 0 and LREG 1, LREG 2 and LREG3, LREG 4 and LREG 5, etc.), and a second hash (e.g., 1-bit has) to identify a specific LREG among the LREG grouping, e.g., whether the register is LREG 0 or LREG 1.

The data processing system also implements a combined evictor tag (ETAG) to identify the most recent dispatched instruction. In response to a flush event, the processor of the data processing system can determine a most recent subsequent dispatched instruction based on the combined ETAG, and can unset all the ETAG valid bits set by the most the most recent subsequent instruction along with all previous subsequent instructions. In this manner, the number of ETAG comparisons that must be compared in response to a flush event is reduced.

Figure 1:
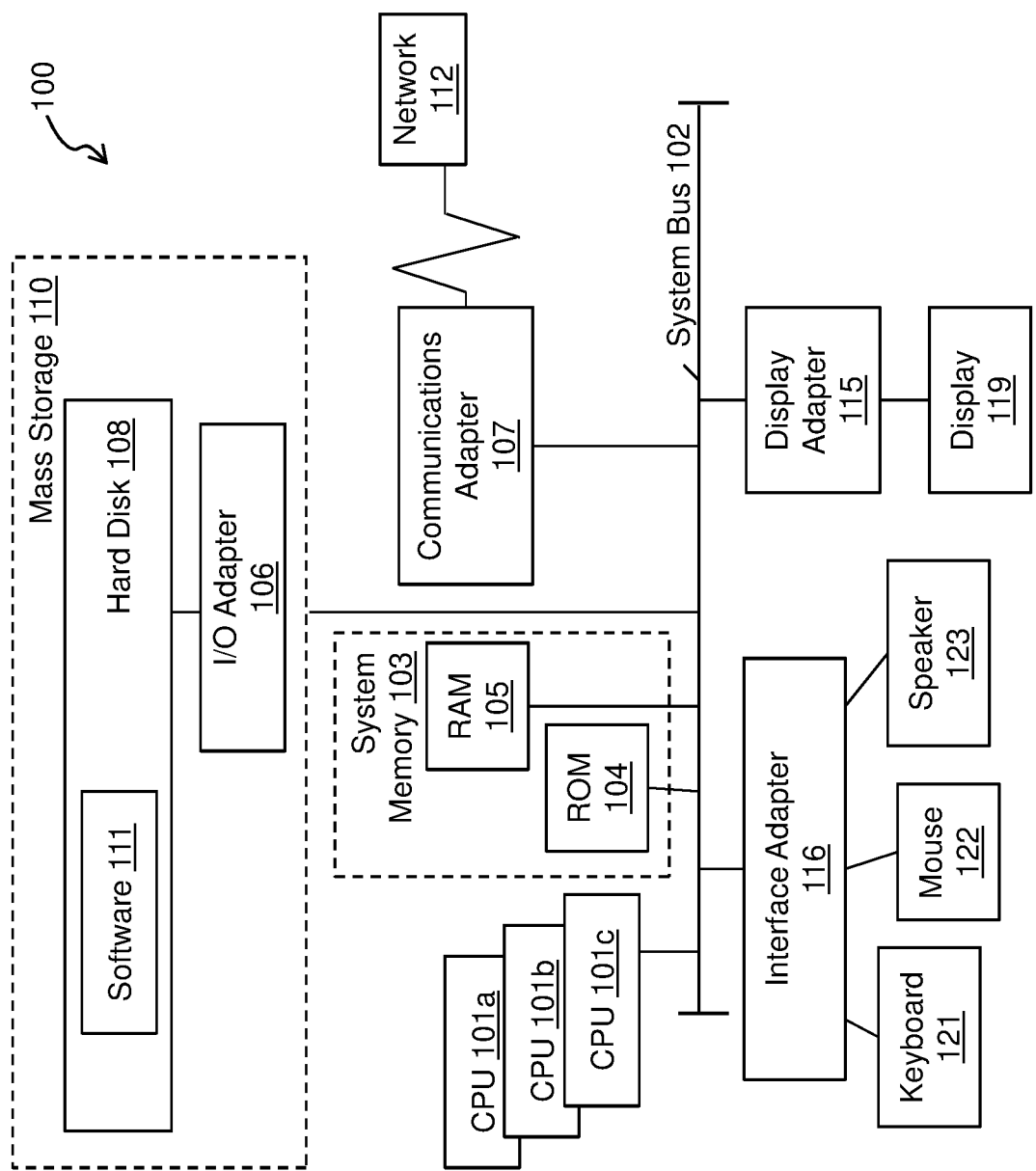
FIG. 1 is a block diagram of an example computer system according to a non-limiting embodiment of the invention.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others.

As shown in FIG. 1, the computer system 100 has one or more central processing units (CPU(s)) 101a, 101b, 101c, etc. (collectively or generically referred to as processor(s) 101). The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110. A software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate as described herein. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1.

Figure 2:
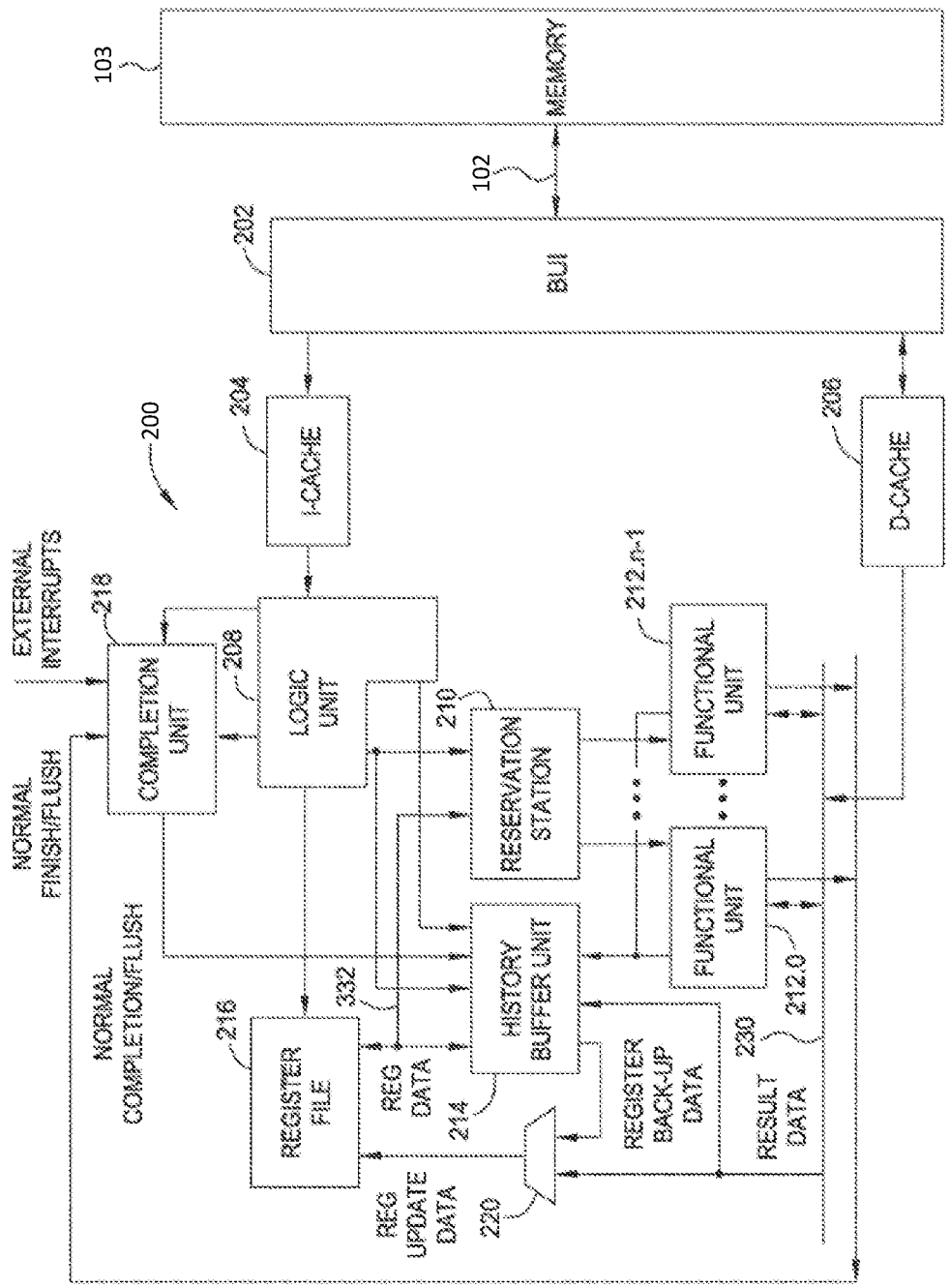
FIG. 2 is a block diagram of a processor capable of performing imprecise register dependency tracking according to a non-limiting embodiment of the invention.

Referring now to FIG. 2, a block diagram a processor 200 that may include one or more multi-level HBs, according to one embodiment. Processor 200 has a bus interface unit 202 coupled to the bus 102 for controlling transfers of data and instructions between memory, such as random access memory 114, and caches, e.g. instruction cache (I-Cache) 204 and data cache (D-Cache) 206.

Instructions may be processed in the processor 200 in a sequence of logical, pipelined stages. However, it should be understood that the functions of these stages, may be merged together, so that this particular division of stages should not be taken as a limitation, unless such a limitation is indicated in the claims herein. Indeed, some of the previously described stages are indicated as a single logic unit 208 in FIG. 2 for the sake of simplicity of understanding and because each distinction between stages is not necessarily central to the present invention.

Logic unit 208 in FIG. 2 includes a fetch unit, a branch processing unit, an instruction buffer, a decode unit, and a dispatch unit. The logic unit 208 fetches instructions from instruction cache 204 into the instruction buffer, either based on a normal sequence of the instructions or, in the case of a sequence having a conditional branch instruction, a predicted sequence. The predicted sequence can be determined in accordance with addresses selected by the branch processing unit. The logic unit 208 also decodes the instructions and dispatches them to an appropriate functional unit (e.g., execution unit) 212.0, 212.1, . . . 212.$n$−1 via reservation station 210. In executing the instructions, the units 212 input and output information to registers (shown collectively as register file (RF) 216). Register file 216 may include an array of processor registers (e.g., general purpose registers (GPRs), vector and scalar registers (VSRs), etc.). Register file 216 can include a number of RF entries or storage locations, each RF entry storing a 64-bit double word and control bits. In some cases, an RF entry may store 128-bit data. In one embodiment, register file 216 is accessed and indexed by logical register (LREG) identifiers, e.g., r0, r1, . . . , rn. Each RF entry holds the most recent (or youngest) fetched instruction and its ITAG. In some cases, each RF entry may also hold the most recent (or youngest) target result data corresponding to a LREG for providing the result data to a next operation. A new dispatch target replaces (or evicts) a current RF entry. In such cases, the current RF entry can be moved to the history buffer (HB) logic unit 214.

The functional units 212 signal the completion unit 218 upon execution of instructions and the completion unit 218 retires the instructions, which includes notifying HB logic unit 214. As will be explained in detail later, the HB logic 214 may save a processor state before, for example, an interruptible instruction, so that if an interrupt occurs, HB control logic may recover the processor state to the interrupt point by restoring the content of registers. HB logic 214 may use a multi-level HB for speculative transactions (e.g., transactional memory) in processor 200.

Functional units 212 also assert results on one or more result buses (e.g. write back buses) 230 so that the results may be written by one or more write ports 220 to the registers in the register file 216. In addition to notifying the HB logic unit 214 about retired instructions, the completion unit 218 or logic unit 208 may also notify the HB unit 214 about exception conditions and mis-predicted branches for which instructions should be discarded prior to completion and for which the HB unit 214 should recover a state of the processor 200 as will be further described below. The HB logic unit 214 may also receive other information about dispatched instructions from the logic unit 208, the register file 216, and one or more functional units 212.

In some embodiments, a CPU 200 may have multiple execution/processing slices with each slice having one or more of the units shown in FIG. 2. For example, each processing slice may have its own logic unit 208, register file 216, history buffer unit 214, reservation station 210 and functional/execution units 212. A CPU 200 having the multiple processing slices may be capable of executing multiple instructions simultaneously, for example, one instruction in each processing slice simultaneously in one processing cycle. Such a CPU having multiple processing slices may be referred to as a multi-slice processor or a parallel-slice processor. Each processing slice may be an independent processor (e.g., processor 200) and may execute instructions independently of other processing slices in the multi-slice processor.

In some embodiments, when a microprocessor (e.g., CPU 200) is executing a speculative Transactional Memory (TM) instruction, all pre-TM register states must be saved. When the TM instruction has successfully completed (i.e., passed), all these saved states may be discarded. However, if the speculative transaction fails, all pre-TM registers may be restored before execution may resume. In some cases, a TM mode may include executing a speculative transaction corresponding to a single processing thread. A speculative transaction typically includes a sequential block of software codes. In one embodiment, a transaction may be committed only if the transaction passes (e.g., does not conflict with other transactions corresponding to other threads). In some embodiments, a speculative transaction may be executed in a particular slice of a multi-slice processor 300. Also, two or more speculative transactions may be executed in parallel by two or more processing slices of the multi-slice processor, one transaction per slice. The transactions are speculative since the system does not know if the data generated by the transaction will actually result in an architected state or not. As noted above, if a transaction fails, the system may have to be restored back to the pre-TM state.

In some cases, pre-TM states (e.g. data values of registers evicted out by instructions in the TM mode) may be stored in the history buffers, and restored as and when required. In certain aspects, the TM mode may include speculative branch executions, rollbacks and completions within the transaction of the TM mode, yielding speculative architected states of one or more registers that are true at least until the TM mode is running (i.e., the transaction is active). However, the speculative architected states of the registers may be rolled back to pre-TM states once the TM mode is completed, e.g. TM mode fails or is aborted. Further, there may be one or more nested transactions within a transaction thread.

Figure 3A:
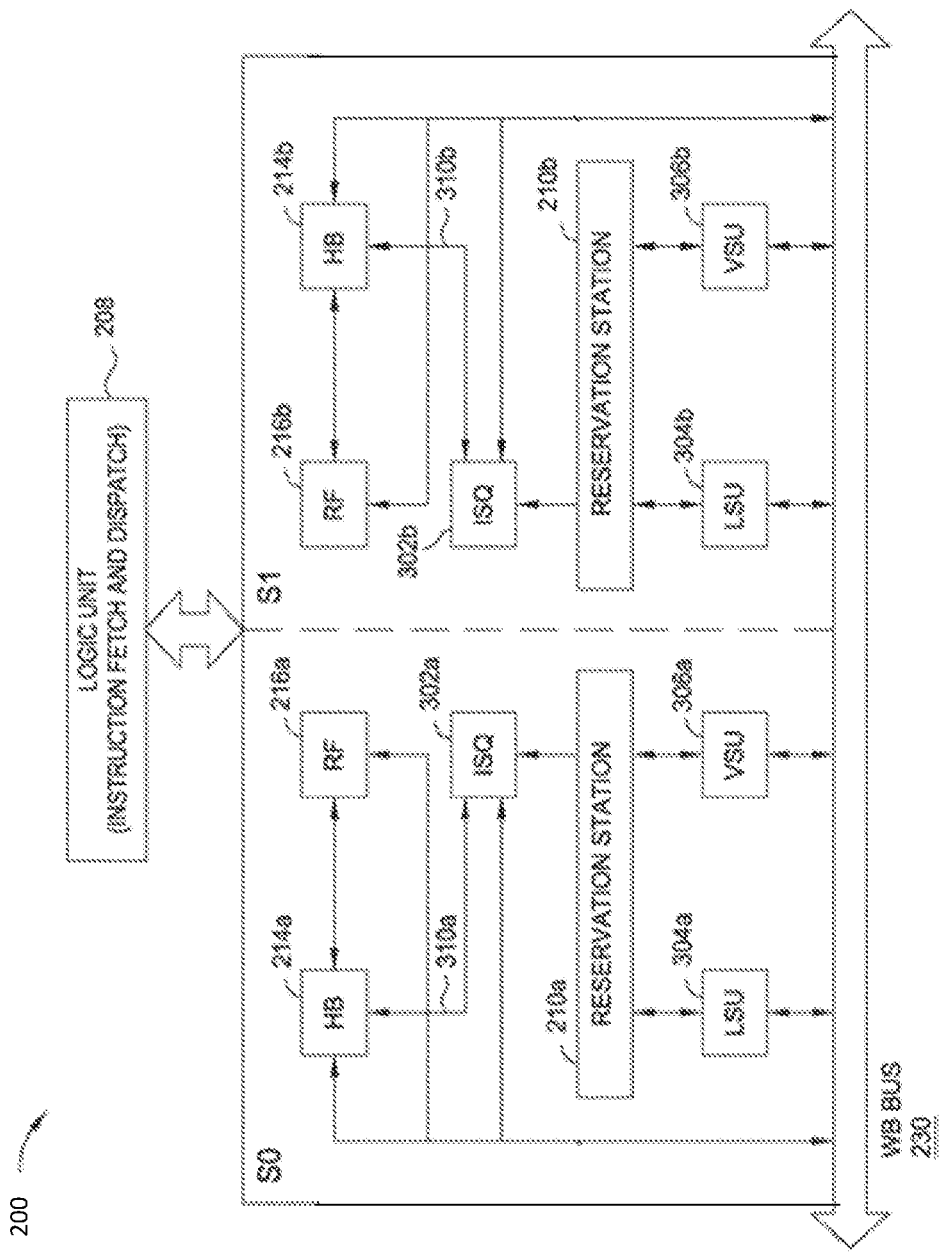
FIG. 3A is a block diagram of multi-slices included in a processor capable of performing imprecise register dependency tracking according to a non-limiting embodiment of the invention.
Figure 3B:
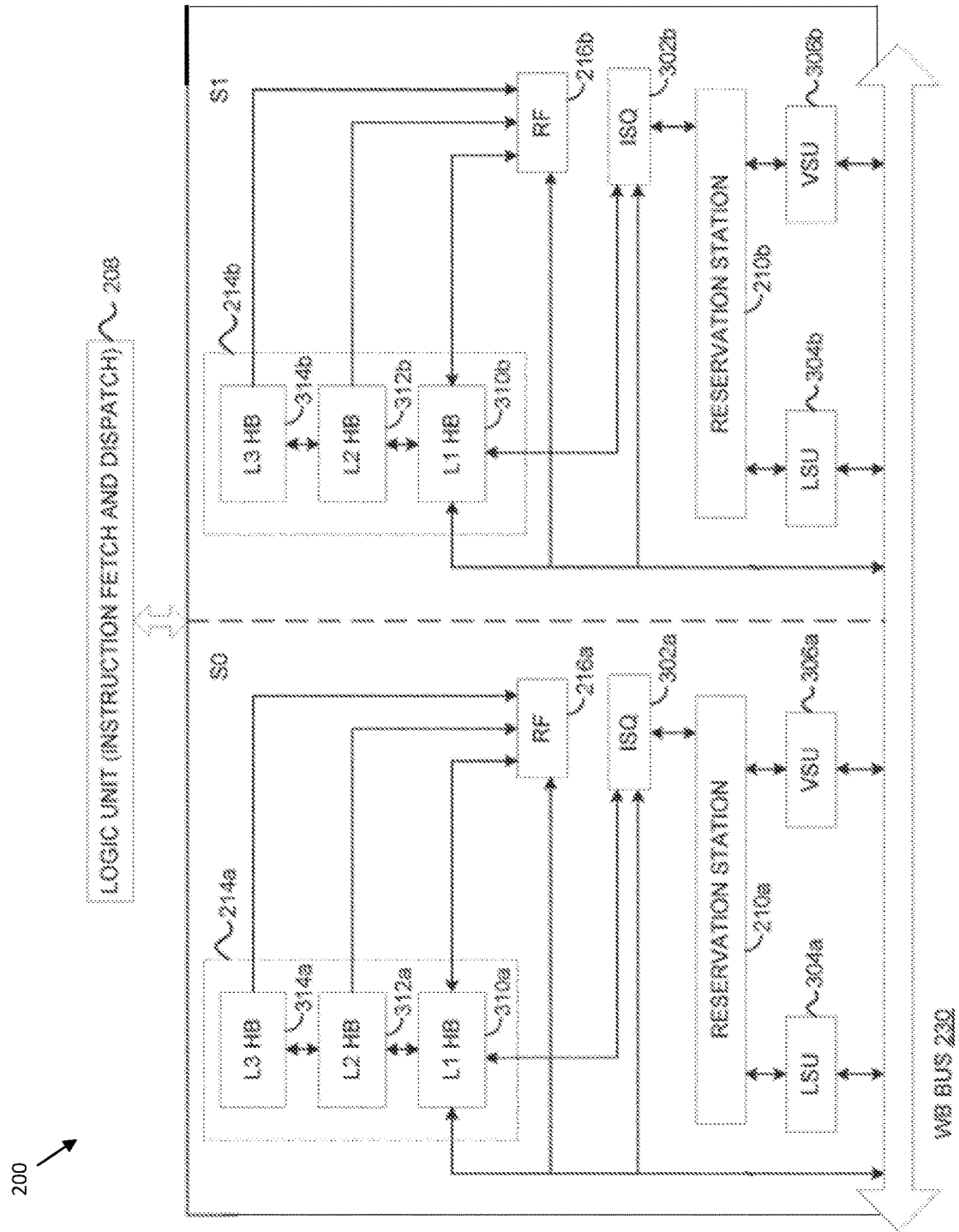
FIG. 3B is a block diagram of multi-slices included in a processor capable of performing imprecise register dependency tracking according to a non-limiting embodiment of the invention.

Referring now to FIGS. 3A and 3B, the operation of multi-slices included in processor 200 capable of performing imprecise register dependency tracking is illustrated according to a non-limiting embodiment of the invention. FIGS. 3A and 3B illustrate a multi-slice processor 200 that may include one or more multi-level history buffers (HBs) for transactional memory, according to one embodiment. It may be noted that FIGS. 3A and 3B only show portions/components of the multi-slice processor 200 that are relevant for this discussion. As shown in FIG. 3A, the multi-slice processor 200 includes two processing slices Slice 0 and Slice 1. Each of the Slices 0 and 1 includes an issue queue (ISQ) (302 *a* and 302 *b*), a reservation station (210 *a* and 210 *b*), execution units including a load store unit (LSU) (304 *a* and 304 *b*), a vector scalar unit (VSU) (306 *a* and 306 *b*), a register file (RF) (216 *a* and 216 *b*), and a HB unit (214 *a* and 214 *b*). As shown, logic unit 208 may perform instruction fetch and dispatch for the multi-slice processor. In one embodiment, the slices 0 and 1 may share one register file 216 having an array of GPRs and/or VSRs. In one embodiment, slices may share more than one register file 216, which is configured as a register bank. In one embodiment, slices 0 and 1 may use register file 216 and other components therein for register renaming.

The reservation station may include a bank of register entries. The ISQ 302 can hold a set of instructions and the reservation station can accumulate data for the instruction inputs. When an instruction is dispatched, the ISQ 302 may allocate an RF entry for the instruction. The source RF entries required as input for the instruction are looked up and passed on to the reservation station. When all source data accumulates for the instruction, the reservation station passes it on to one or more execution units designated for execution of the instruction. In an aspect, the reservation station is part of the ISQ 302. Each of the LSUs 304 and VSUs 306 may make result data available on the write back buses 230 for writing into an RF entry or HB entry. In some embodiments, each of the LSUs 304 and VSUs 306 may have a corresponding WB bus 230.

It may be noted that the two slices are shown for ease of illustration and discussion only, and that multi-slice processor 200 may include more than two slices with each slice having all the components discussed above for each of the slices 0 and 1. Further, the processing slices may be grouped into super slices (SS), with each super slice including a pair of processing slices. For example, a multi-slice processor may include two super slices SS0 and SS1, with SS0 including slices 0 and 1, and SS1 including slices 2 and 3. In some cases, one register file 216 may be allocated per super slice and shared by the processing slices of the super slice.

In some embodiments, the slices 0 and 1 of the multi-slice processor 200 may be configured to simultaneously execute independent threads (e.g., one thread per slice) in a simultaneous multi-threading mode (SMT). Thus, multiple threads may be simultaneously executed by the multi-slice processor 200. In an aspect, a super slice may act as a thread boundary. For example, in a multi thread mode, threads T0 and T1 may execute in SS0 and threads T2 and T3 may execute in SS1. Further, in a single thread (ST) mode, instructions associated with a single thread may be executed simultaneously by the multiple processing slices of at least one super slice, for example, one instruction per slice simultaneously in one processing cycle. The simultaneous processing in the multiple slices may considerably increase the processing speed of the multi-slice processor 200.

As noted above, the HB unit 214 may save a processor state before, for example, an instruction indicating start of a speculative transaction, so that if the speculative transaction fails, HB control logic may recover the processor state prior to the start of the speculative transaction by restoring the content of registers. As shown in FIG. 3B, HB unit 214 includes three levels of history buffers, a L1 HB 310, L2 HB 312 and L3 HB 314. Each level of HB may be implemented as a separate circuit in the processor 101. The L1 HB 310 may include all the write ports (i.e., for writing to the L1 HB 310) necessary to sink the multiple write back busses. For example, in one embodiment, the L1 HB 310 may include ten write ports, eight of which are from the eight write back busses of WB Bus 230, and two of which are from the register file 216. To reduce the number of ITAG compares that have to be done on the L1 HB 310, the L1 HB 310 may have a fewer number of entries compared to the L2 HB 312 and L3 HB 314. For example, in one embodiment, the L1 HB 310 may include 16 entries.

In one embodiment, when a new instruction (e.g., second instruction) (targeting one of the LREGs in the register file 216) is dispatched, the new instruction may evict the current RF entry associated with the previous instruction (e.g., first instruction), and the current RF entry may be moved to the L1 HB 310. Each entry in the L1 HB 310, therefore, may include an ITAG of the previous instruction, the previous instruction, the evictor ITAG (ETAG) of the new instruction and one or more control bits (e.g., such as a pre-TM bit). The ETAG is set to a unique identifier (gtag) associated with the new (i.e., younger) writer to the LREG. In some embodiments, the L1 HB entry may also include result data for the first instruction (e.g., from the write back bus 230).

Compared to the L1 HB 310, the L2 HB 312 may have a greater number of entries. For example, in one embodiment, the L2 HB 312 may include 32 entries, 64 entries, etc. At the same time, however, the L2 HB 312 may include a fewer number of write ports compared to the L1 HB 310. For example, in one embodiment, the L2 HB 312 may include a single write port (used for writing a single entry from the L1 HB 310 to the L2 HB 312 in any given cycle). With a fewer number of write ports, the L2 HB 312 may occupy a same or smaller circuit area than the L1 HB 310 with more available entries. In general, however, the L2 HB 312 can be large enough to support the desired amount of in-flight execution in the processor 101 while not in TM mode. For example, the number of write ports in L2 HB 312 can be equal to the desired number of entries to move from the L1 HB 310 to the L2 HB 312 in a given cycle. In one embodiment, when valid data has been written back to an entry in the L1 HB 310, the L1 HB entry can be moved to the L2 HB 312. If the entry is associated with pre-transactional memory, the L2 HB entry may include a pre-TM bit set to 1.

Generally, the L1 HB 310 and L2 HB 312 may independently perform completion and/or flush operations. Typically, when an instruction has finished executing, it may be considered completed and may be retired. Completion of an instruction indicates that there may be no further exceptions requiring restore (such that depositing the results of the instruction will not violate the program order), and the state of the processor (e.g., defined by one or more RF entries) becomes the architected state. Thus, in an architected state any older result corresponding to an RF entry stored in an HB level is not needed. In an aspect, an HB entry needs to remain valid in the HB until its evictor completes, because there may be a flush point between the HB entry and the evictor in the RF, needing a possible restore. Thus, until the evictor completes and the state of the evictor RF entry becomes the architected state, the previous HB entry needs to remain valid. To determine whether an instruction in an entry of the L1 HB 310 and/or L2 HB 312 is "complete," both the L1 HB 310 and L2 HB 312 may independently compare the completion ITAG to the ETAG in each entry. The completion ITAG may be broadcast by the completion unit 218 upon a decision that an instruction corresponding to the entry ITAG is complete. For each entry in L1 HB 310 and/or L2 HB 312, if the ETAG is older than or the same age as the completion ITAG, then the entry can be considered "complete" and invalidated.

In a flush and restore operation, logic unit 208 may determine to restore one or more entries of the register file 216 with entries of the L1 HB 310 and/or L2 HB 320, and signal the L1 HB 310 and/or L2 HB 320 to perform a flush and restore operation. The logic unit 208 may send a flush ITAG to the L1 HB 310 and L2 HB 320 and the L1 HB 310 and L2 HB 320 may independently perform two different ITAG compares based on the flush ITAG. In a first ITAG compare, the flush ITAG, ETAG and entry ITAG are compared. If the entry ITAG is greater/older than the flush ITAG and the flush ITAG is older than/equal to the ETAG, then the entry may be marked for restoration (e.g., a restore pending (RP) bit may be set to 1 for the entry). In a second ITAG compare, the flush ITAG and entry ITAG are compared. If the flush ITAG is older/equal to the entry ITAG, then the entry can be invalidated.

As noted above, however, when the processor 101 is executing a speculative transaction and pre-TM data in the L2 HB 312 has been completed, the pre-TM data cannot be invalidated from the L2 HB 312 until the speculative transaction is completed with a pass/fail indication. Since speculative transactions, in general, take a longer time to execute, the L2 HB 312 can be filled up with a large number of pre-TM states (some of which may have already been completed), which can reduce the performance of the L2 HB 312. Accordingly, embodiments herein use a L3 HB 314 to store completed pre-TM data. Compared to the L1 HB 310 and L2 HB 312, the L3 HB 314 may include enough entries to contain data for all architected LREGs for GPR and VSR in the register file 216. Put differently, the number of entries in the L3 HB 314 may be equal to the number of entries in the register file 216. The L3 HB 314 may include a single write port (e.g., for moving an entry from the L2 HB 312 to L3 HB 314 in a cycle) and a single read port (e.g. for restoring one PTM entry to RF 216 in a cycle).

In one embodiment, when an entry in the L2 HB 312 with a pre-TM bit set to 1 is completed, the entry can be moved to the L3 HB 314 (instead of keeping the pre-TM entry in the L2 HB 312). Each entry in the L3 HB 314 may include the pre-TM bit and the associated pre-TM data. An entry may stay in the L3 HB 314 until Tend (associated with the speculative transaction) is completed with a pass/fail indication. For example, if the speculative transaction passed, then all the pre-TM data in the L3 HB 314 can be discarded. On the other hand, if the speculative transaction failed, valid L3 HB 314 entries can be read out to restore to GPR/VSR in the register file 216.

Figure 4:
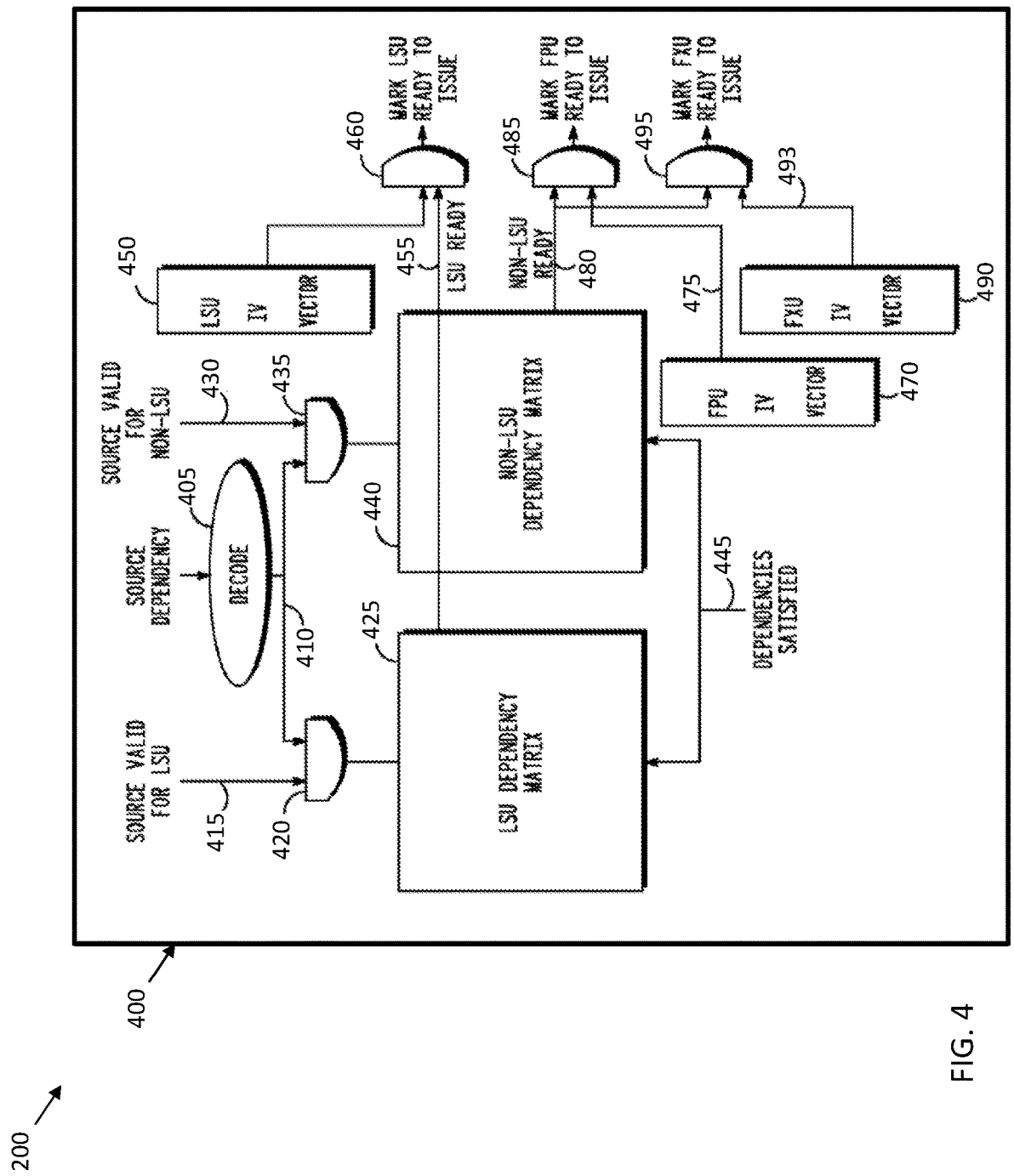
FIG. 4 architectural block diagram of a register-memory microprocessor architecture that includes a dependency unit according to a non-limiting embodiment of the invention.

Turning now to FIG. 4, an example of a dependency unit 400 capable of being employed in a microprocessor 200 is illustrated according to a non-limiting embodiment. In response to a dependency matrix write operation, a single decode may be used to generate dependency write data for both the LSU and the non-LSU matrices. That single decode can then be ANDed with the appropriate LSU or non-LSU source valid bit to generate the decoded source data for that source for that dependency matrix. It can be seen that each source dependency is decoded at decoder 405 to generate decoded dependencies 410. Each decoded dependency 410 is ANDed if that dependency is valid. For example, an LSU dependency 410 is ANDed with a source valid for LSU indicator 415 by logical AND function 420 and written to the LSU dependency matrix 425. As previously mentioned, all such ANDed dependencies may be ORed together into a dependency row to be written into the LSU dependency matrix 425. Similarly, the Non-LSU dependency matrix 440 will AND each dependency when the dependency is valid for any non-LSU execution unit. A non-LSU dependency 410 is ANDed with a source valid for non-LSU indicator 430 by logical AND function 435 and written to the non-LSU dependency matrix 440.

The LSU and non-LSU dependency matrices 425 and 440, respectively, will each output their own ready vector, which may then be ANDed with the appropriate issue valid bits to determine if the part of an operation destined for a particular execution unit is ready to issue. For example, the LSU dependency matrix output 455 will be ANDed via logical AND function 460 with the LSU issue valid bits output from LSU vector unit 450 to determine the LSU ready vector. Where the Fixed Point Unit (FXU) and the Floating-Point Unit (FPU) parts of the execution unit are of interest, for example, the non-LSU dependency matrix output 480 will be ANDed via logical AND function 495 with the FXU issue valid bits generated from FXU vector unit 490 to write the FXU ready vector, and the FPU issue valid bits will be ANDed via logical AND function 485 with the non-LSU dependency matrix output generated from FPU vector unit 470 to generate the FPU ready vector.

During dispatch of the instruction, only an LSU Issue Valid (IV) indicator, such as a bit, is set, thereby allowing only the LSU part of the dual-issued instruction to issue. This is indicated by the LSU IV vector 450 which provides an input, along with the LSU ready signal 455 from the LSU dependency matrix 425 to logical AND function 460, to produce the Mark LSU Ready to Issue output 460. In this manner, when all of the LSU dependencies have been satisfied, the LSU dependency matrix 425 will indicate that the LSU part of the instruction is ready to issue. The LSU part of the instruction is marked ready to issue. At some later time, the LSU part of the instruction is issued. The LSU IV bit is then cleared, or marked as not ready to issue. It is noted that the LSU part of the instruction can be ready to issue even when the non-LSU part, such as the FXU, FPU or other execution part of the instruction is not. At this time, the non-LSU issue valid (non-LSU IV) indicator, such as FXU/FPU IV bits, are off, thereby preventing issuance of the non-LSU part of the instruction.

The issue of the non-LSU part of the instruction must follow execution of the LSU part of the instruction. After enough time has passed since the LSU part of the dual issue instruction has issued, the correct non-LSU IV indicator is set as valid to issue.

Once all of the dependencies needed by the execution units have been met and satisfied, the non-LSU dependency matrix 440 will indicate that the execution unit, non-LSU part of the instruction is ready to issue. Once the appropriate execution unit non-LSU IV bit is set and the non-LSU dependency matrix 440 indicates that the execution unit part of the instruction is ready to issue, the non-LSU part of the instruction will be marked ready to issue. Sometime later, the execution part of the instruction is issued. The non-LSU IV bit is then cleared, or marked as not ready to issue. Thus, the non-LSU portion of the dual-issue instruction is only issued once the plurality of non-LSU dependencies of the dual issue instruction are satisfied.

Thus, after an adequate time, FXU/FPU IV bits can be set as valid to issue. This is illustrated by the non-LSU ready signal 480 from the non-LSU dependency matrix 440. At this time, the dependencies needed by the non-LSU part of the instruction can be checked. Once all of the dependencies needed by the execution units have been met and satisfied, as indicated by Dependencies Satisfied signal 445, the non-LSU dependency matrix 440 will indicate that the execution unit, non-LSU part of the instruction is ready to issue. Once the appropriate execution unit non-LSU IV bit is set and the non-LSU dependency matrix 440 indicates that the execution unit part of the instruction is ready to issue, the non-LSU part of the instruction will be marked ready to issue.

The non-LSU ready signal 480 and the FPU IV indicator 475 from FPU IV vector 470, both of which are received and ANDed by logic AND function 285 to generate Mark FPU Ready to Issue signal. Similarly, for the FXU consideration, the non-LSU ready signal 480 from non-LSU dependency matrix 440 and the FXU IV indicator 493 from FXU IV vector 490 are ANDed by logical AND function 495 to generate Mark FXU Ready to Issue signal.

Sometime later, the execution part of the instruction is issued. The non-LSU IV bit is then cleared, or marked as not ready to issue. Thus, the non-LSU portion of the dual-issue instruction is only issued once the plurality of non-LSU dependencies of the dual issue instruction are satisfied.

In cases where an operation is not dual-issued, only one of the dependency matrices will be used, and the other will be ignored. The relevant issue valid bit of the used dependency matrix will be set. Results of the issue queue slot are marked available when the results of the single operation will be available. If an operation is dual-issued, only the LSU part is initially marked as issue valid.

Figure 5:
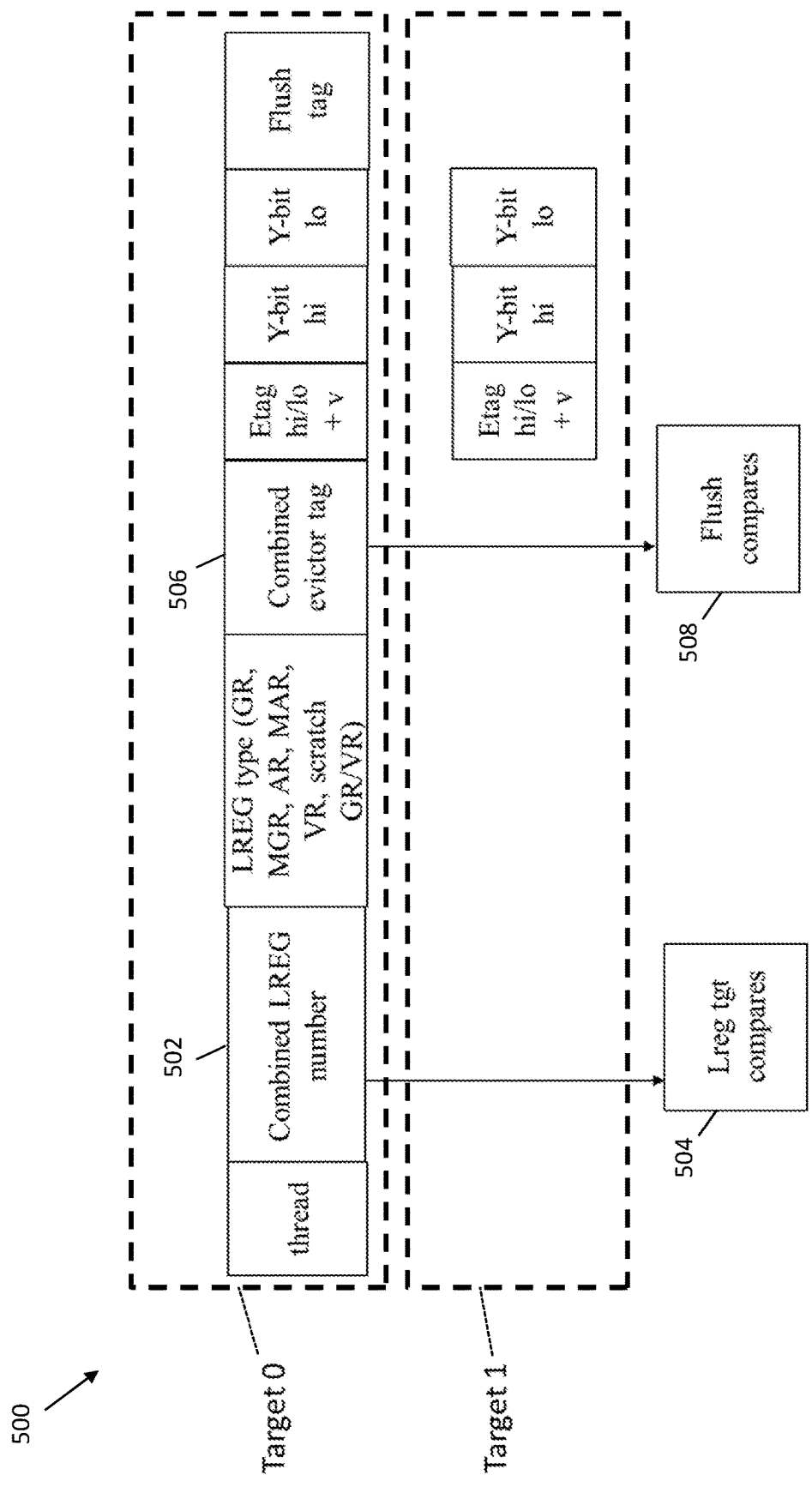
FIG. 5 is a block diagram illustrating optimized tracking elements to facilitate an imprecise register dependency tracking operation according to a non-limiting embodiment of the invention.

Referring to FIG. 5, an arrangement of optimized tracking elements 500 corresponding to targets (e.g. target 0 and target 1) of a given uop to facilitate an imprecise register dependency tracking operation is illustrated according to a non-limiting embodiment of the invention. Unlike conventional dependency tracking operations that rely on multiple individual LREG numbers to identify each target (e.g., target 0 and target 1) of a given uop, at least one non-limiting embodiment described herein employs a combined LREG number 502 to identify each target (e.g., target 0 and target 1) of a given uop. As a result, the number of required LREG target compare operations 504 performed each time a new uop is dispatched is reduced (e.g., from 2 compare operations to 1 compare operation).

Similarly, conventional dependency tracking operations employ multiple individual ETAGs. For example, a conventional dependency tracking operation employs a first ETAG for a first register corresponding to a first register Hi half storage element and second ETAG for the first register corresponding to a first register Lo half storage element, along with a third ETAG for a second register corresponding to a second register Hi half storage element and a fourth ETAG for the second register corresponding to a second register Lo half storage element.

At least one non-limiting embodiment described herein, however, employs a single combined ETAG 506. The combined ETAG 506 is qualified by four ETAG valid bits, which identify a given register along with the Hi and Lo halves of the given register. As a result, the number of flush compare operations 508 is reduced (e.g., from 4 compare operations to 1 compare operation).

The dependency unit 400 is capable of reducing the number of ETAGs in an entry by updating the y-bits during pipeline flushes. For instance, conventional dependency tracking schemes set the associated ETAG and ETAG valid bit whenever a new writer (i.e., evictor) to that register dispatches for each y-bit that is valid in an entry (i.e. each register that is written by the uop occupying the issue queue position corresponding to this entry), and also un-sets the corresponding y-bit. Whenever a pipeline flush affects the new writer (i.e., evictor) but not the original entry, the conventional dependency scheme unsets the ETAG valid bit and sets the y-bit.

As described above, the dependency unit 400 described herein requires only a single ETAG field per entry. For each y-bit that is valid in an entry (i.e. each register that is written by the uop occupying the issue queue position corresponding to this entry), the dependency unit 400 sets the ETAG and associated ETAG valid bit whenever a new writer (i.e., evictor) to that register dispatches, and un-sets the corresponding y-bit. The dependency unit 400 also updates the ETAG as other new writers (i.e., evictors) dispatch that match the y-bits that are remain set, and sets the ETAG to a unique identifier (gtag) associated with the newest writer (i.e., evictor). Unlike the conventional scheme, whenever a pipeline flush affects the newest writer (i.e., evictor) but not the original entry, the dependency unit 400 unsets all the ETAG valid bits and sets all the corresponding y-bits. Accordingly, the number of ETAGs associated with an entry is reduced, thereby reducing the amount of circuits required and improving overall area and power consumption. The reduced number of ETAGs also reduces the amount of hardware needed to track dependencies, thereby further reducing the overall costs of the system.

Figure 6:
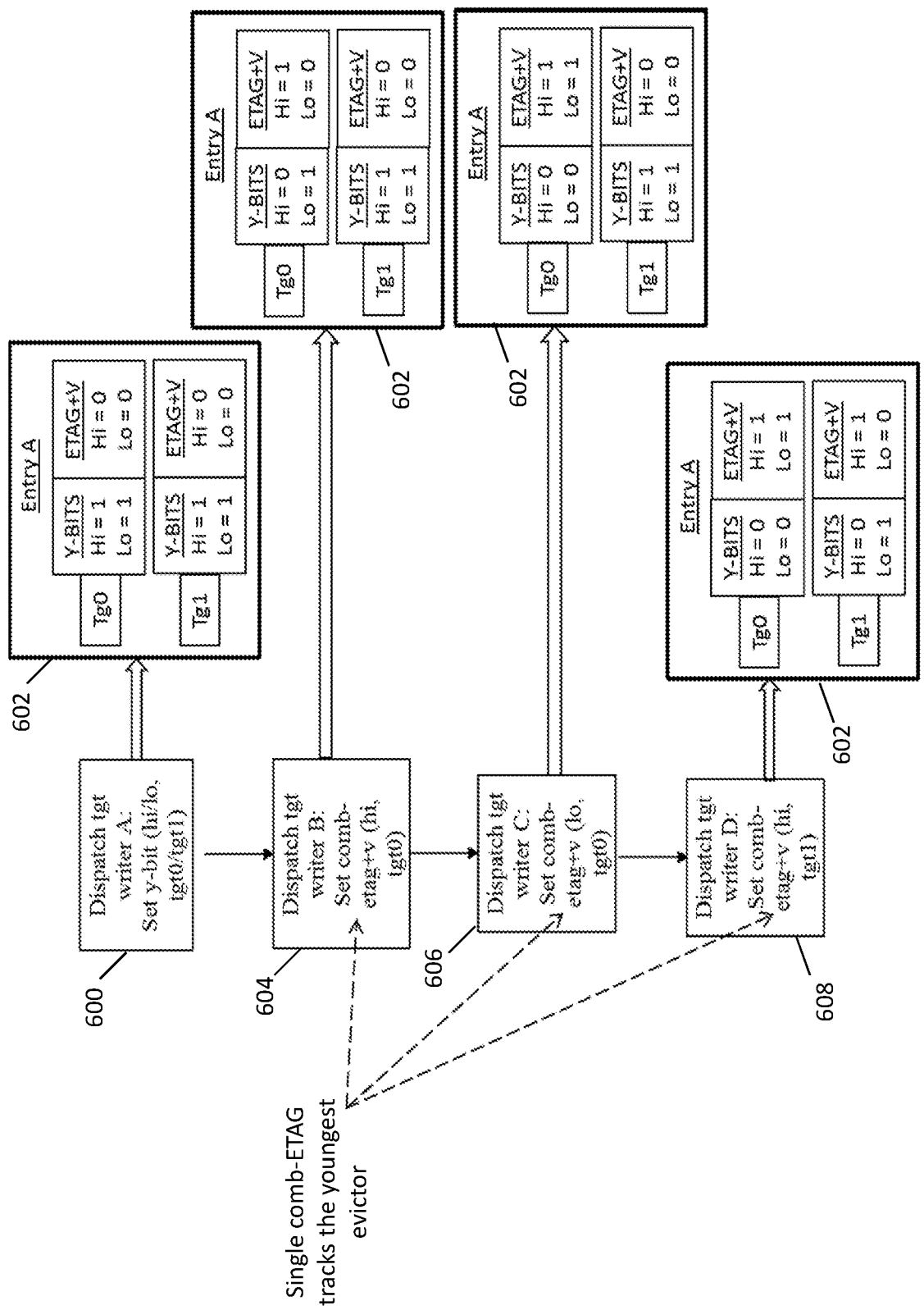
FIG. 6 illustrates an optimized dependency tracking operation according to a non-limiting embodiment of the invention.

FIG. 6 illustrates an example of an optimized dependency tracking operation performed by a dependency unit 400 according to a non-limiting embodiment of the invention. A first dispatch target writer 600 ("Dispatch tgt writer A") initially writes to each of the Hi and Lo halves of both target register 0 (Tg0) and target register 1 (Tg1). Accordingly, Entry A 602 corresponding to the first dispatch target writer 600 is updated. For instance, the y-bits for the Hi and Lo halves are each set to "1". Since no younger instructions (i.e., evictors) have been dispatched, the Hi and Lo evictor bits for the Tg0 and Tg1 are set to "0."

A second dispatch target writer 604 ("Dispatch tgt writer B") is shown subsequently writing to the Hi half of Tg0 in response to a newly dispatched uop. Because the first dispatch target writer 600 had initially written to the Hi half of Tg0, Entry A 602 is now updated such that y-bit corresponding to the Hi half of Tg0 is invalidated, i.e., is set to "0". In addition, because the second dispatch target writer 604 is viewed as an evictor with respect to the first dispatch target writer 600, Entry A 602 is also updated such that the evictor bit corresponding to the Hi half of Tg0 is validated, i.e., is set to "1" and the combined evictor tag of Entry A 602 is set to the gtag of writer B.

Similarly, a third dispatch target writer 606 ("Dispatch tgt writer C") is shown subsequently writing to the Lo half of Tg0 in response to another newly dispatched uop. Because the first dispatch target writer 600 had initially written to the Hi half of Tg0, Entry A 602 is now updated such that y-bit corresponding to the Lo half of Tg0 is invalidated, i.e., is set to "0". In addition, because the third dispatch target writer 606 is viewed as an evictor with respect to the first dispatch target writer 600, Entry A 602 is also updated such that the evictor bit corresponding to the Lo half of Tg0 is validated, i.e., is set to "1" and the combined evictor tag of Entry A 602 is set to the gtag of writer C.

Lastly, a fourth dispatch target writer 608 ("Dispatch tgt writer D") is shown subsequently writing to the Hi half of Tg1 in response to another newly dispatched uop. Because the first dispatch target writer 600 had initially written to the Hi half of Tg1, Entry A 602 is now updated such that y-bit corresponding to the Hi half of Tg1 is invalidated, i.e., is set to "0". In addition, because the fourth dispatch target writer 608 is viewed as an evictor with respect to the first dispatch target writer 600, Entry A 602 is also updated such that the evictor bit corresponding to the Hi half of Tg1 is validated, i.e., is set to "1" and the combined evictor tag of Entry A 602 is set to the gtag of writer D.

Figure 7:
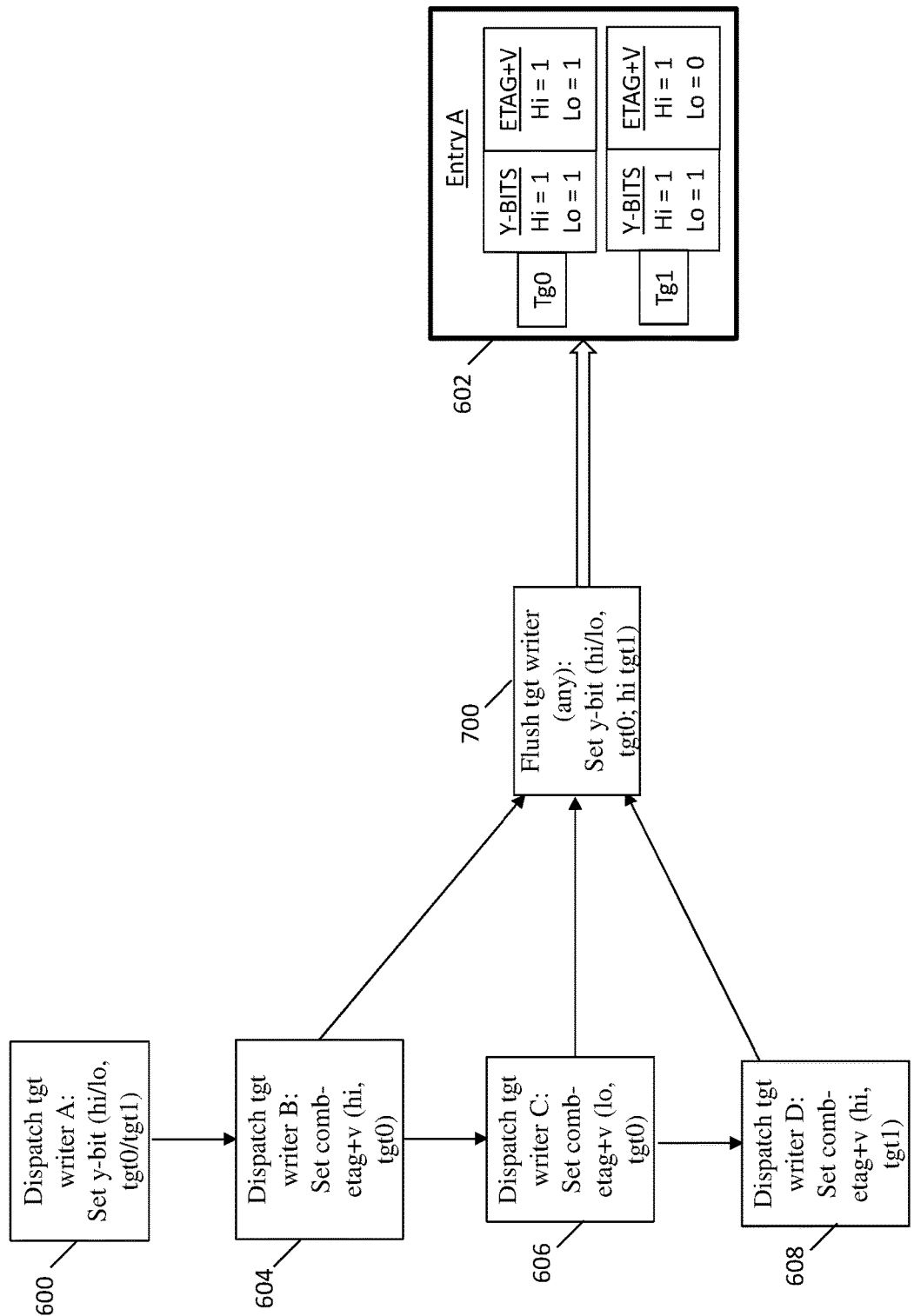
FIG. 7 illustrates an optimized dependency tracking operation following a flush event according to a non-limiting embodiment of the invention.

Turning to FIG. 7, a flush event 700 can occur, which performs a flush on any one of the dispatch target writers 604, 606 and 608. In response to the flush event 700, the y-bits of Entry A 602 that were invalidated (i.e., set to "0") by the previous evictor writes are reset. Therefore, in this example Entry A 602 is updated such that the y-bits corresponding to the Hi and Lo halves of Tg0, along with the y-bit corresponding to the Hi half of Tg1 are re-set to "1". Entry A 602 is also updated such that the ETAG valid bits are all set to "0".

Figure 8:
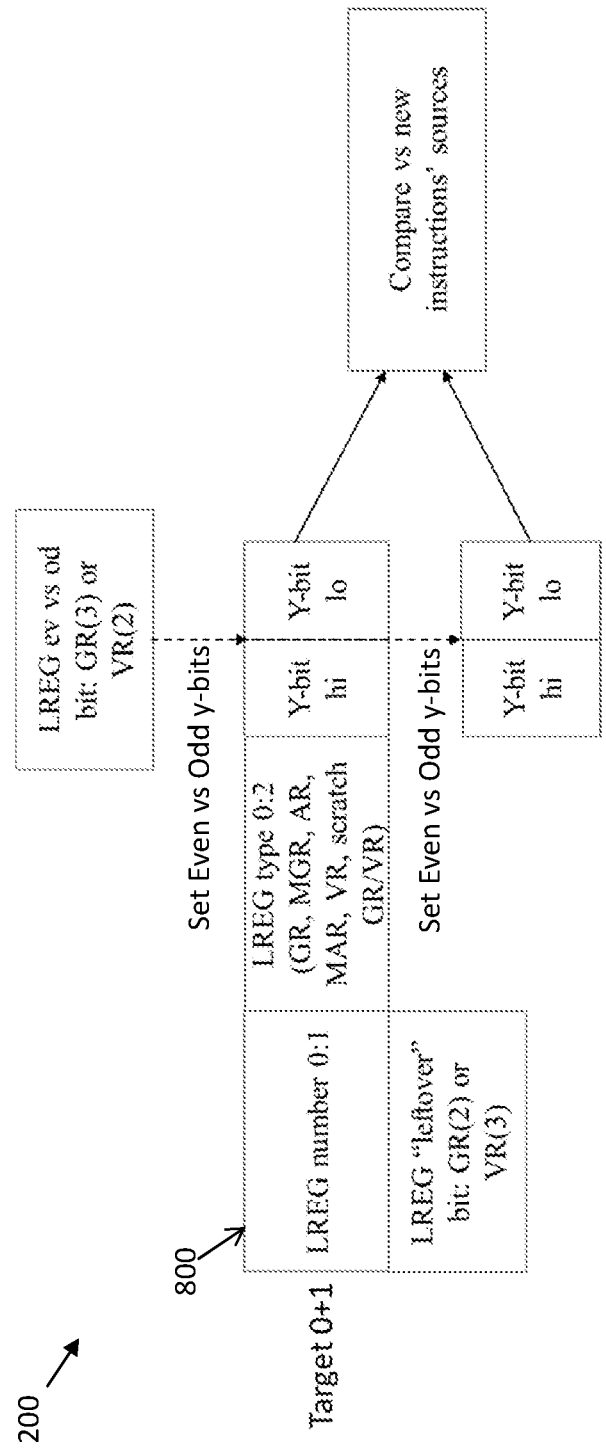
FIG. 8 is a block diagram illustrating an optimized LREG achieved from performing an optimized dependency tracking operation according to a non-limiting embodiment.

With reference now to FIG. 8, the computer data processing system 200 according to a non-limiting embodiment implements an LREG combination unit 800 that encodes source LREGs using a first hash that determines a group of LREGs (e.g., LREG 0 and LREG 1, LREG 2 and LREG3, LREG 4 and LREG 5, etc.). A second 1-bit hash is then utilized to identify the specific even or odd LREG among the LREG grouping, e.g., whether the register is LREG 0 or LREG 1. Accordingly, the LREG combination unit 800 can generate a single combined LREG number to identify each target (e.g., target 0 and target 1) of a given uop.

For example, the LREG combination unit 800 can encode source LREGs using a combination of (1) a single 3-bit field composed of two LREG number most significant bits and either the third most significant bit for general registers (Grs) or the least significant bit for vector registers (VRs); and (2) the "y-bits", which are a unique set of LREG bits corresponding to a first bit group including a Hi bit and a Lo bit of a first register, and a second bit group including a Hi bit and Lo bit of a second register. The first group of y-bits (e.g., "event" bits) can correspond to an even register (e.g., LREG X), for example, while the second group of y-bits (e.g., "odd" bits) correspond to an odd register (e.g., LREG X+1) for GR applications, or LREG X+2 for VR applications. Accordingly, an out-of-order microprocessor according to the present teachings described herein can leverage a design architecture that requires GRs be encoded with values X and X+1, while VRs be encoded as X and X+2, where "X" is a number of encoded bits. Accordingly, a source LREG can be encoded using significantly less bits (e.g., a single 3-bit field) compared to conventional dependency tracking systems (e.g., two 4-bit fields totaling 8-bits). In this manner, the computing data processing system 200 described herein significantly reduces the amount of both data storage hardware (latches) and data comparison hardware (every ETAG field must be compared against the flush ETAG; which in some systems can amount to 72 compares per ETAG).

The present techniques may be a system, a method or an apparatus. The flowchart and block diagrams in the Figures illustrate the architecture, functionality, and operation of possible implementations of systems, methods, and apparatus according to various embodiments of the present techniques. In this regard, each block in the flowchart or block diagrams may represent a module, segment, or portion of logic for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for tacking dependencies of entries in an issue queue, the method comprising:
    establishing a plurality of logical registers (LREGs), each LREG including a plurality of individual storage sections;
    writing data to at least one of the individual storage sections of at least one of the LREGs based on a dispatched first instruction, and setting at least one valid bit corresponding to at least one of the individual storage sections that receives the data;
    dispatching a plurality of subsequent instructions after the first instruction;
    in response to dispatching each subsequent instruction, setting at least one evictor valid bit indicating a subsequent instruction has written new data to at least one of the individual storage sections of at least one of the LREGs written by the first instruction, and updating the at least one valid bit to indicate the at least one of the individual storage sections containing the new written data;
    generating a combined evictor tag (ETAG) to identify a most recent subsequent instruction among the plurality of subsequent instructions, and
    in response to a flush event, determining the most recent subsequent instruction based at least in part on the combined ETAG, and unsetting all the ETAG valid bits set by the most recent subsequent instruction along with all previous subsequent instructions.

2. The computer-implemented method of claim 1, further comprising in response to the flush event, re-setting the at least one valid bit corresponding to the at least one of the individual storage sections set according to the dispatched first instruction.

3. The computer-implemented method of claim 2, wherein the at least one LREG that receives the written data includes a group of individual LREGs.

4. The computer-implemented method of claim 3, further comprising generating a combined LREG number to identify the group of individual LREGs corresponding to the most recent subsequent instruction.

5. The computer-implemented method of claim 4, wherein the combined LREG number comprises a first hash that identifies the group of individual LREGs, and a second hash that identifies a given LREG among the group of individual LREGs.

6. The computer-implemented method of claim 5, wherein the at least one valid bit includes a plurality of valid bits, and the combined LREG number further comprises the plurality of valid bits to identify the plurality of individual storage sections in a given LREG among the group of individual LREGs.

7. A computer program product to control device computing system to track dependencies of entries in an issue queue, the computer program product comprising a computer readable storage medium having program instructions embodied therewith, the program instructions executable by an electronic computer processor to control the computing system to perform operations comprising:
   establishing a plurality of logical registers (LREGs), each LREG including a plurality of individual storage sections;
   writing data to at least one of the individual storage sections of at least one of the LREGs based on a dispatched first instruction, and setting at least one valid bit corresponding to at least one of the individual storage sections that receives the data;
   dispatching a plurality of subsequent instructions after the first instruction;
   in response to dispatching each subsequent instruction, setting at least one evictor valid bit indicating a subsequent instruction has written new data to at least one of the individual storage sections of at least one of the LREGs written by the first instruction, and updating the at least one valid bit to indicate the at least one of the individual storage sections containing the new written data;
   generating a combined evictor tag (ETAG) to identify a most recent subsequent instruction among the plurality of subsequent instructions, and
   in response to a flush event, determining the most recent subsequent instruction based at least in part on the combined ETAG, and unsetting all the ETAG valid bits set by the most recent subsequent instruction along with all previous subsequent instructions.

8. The computer program product of claim 7, further comprising in response to the flush event, re-setting the at least one valid bit corresponding to the at least one of the individual storage sections set according to the dispatched first instruction.

9. The computer program product of claim 8, wherein the at least one LREG that receives the written data includes a group of individual LREGs.

10. The computer program product of claim 9, further comprising generating a combined LREG number to identify the group of individual LREGs corresponding to the most recent subsequent instruction.

11. The computer program product of claim 10, wherein the combined LREG number comprises a first hash that identifies the group of individual LREGs, and a second hash that identifies a given LREG among the group of individual LREGs.

12. The computer program product of claim 11, wherein the at least one valid bit includes a plurality of valid bits, and the combined LREG number further comprises the plurality of valid bits to identify the plurality of individual storage sections in a given LREG among the group of individual LREGs.

13. A computer data processing system comprising:
   a plurality of logical registers (LREGs), each LREG including a plurality of individual storage sections;
   a processor configured to write data to at least one of the individual storage sections of at least one of the LREGs based on a dispatched first instruction, and to set at least one valid bit corresponding to at least one of the individual storage sections that receives the data;
   wherein the processor detects a subsequent instruction, and in response to each subsequent instruction, sets at least one evictor valid bit indicating a subsequent instruction has written new data to at least one of the individual storage sections of at least one of the LREGs written by the first instruction, and updates the at least one valid bit to indicate the at least one of the individual storage sections containing the new written data; and
   an LREG combination unit configured to generate a combined evictor tag (ETAG) to identify a most recent subsequent instruction among the plurality of subsequent instructions, and
   wherein the processor determines the most recent subsequent instruction based at least in part on the combined ETAG in response to a flush event, and unsets all the ETAG valid bits set by the most recent subsequent instruction along with all previous subsequent instructions.

14. The computer data processing system of claim 13, wherein, in response to the flush event, the processor resets the at least one valid bit corresponding to the at least one of the individual storage sections set according to the dispatched first instruction.

15. The computer data processing system of claim 13, wherein the at least one LREG that receives the written data includes a group of individual LREGs.

16. The computer data processing system of claim 15, wherein the LREG combination unit generates a combined LREG number to identify the group of individual LREGs corresponding to the most recent subsequent instruction.

17. The computer data processing system of claim 16, wherein the combined LREG number comprises a first hash that identifies the group of individual LREGs, and a second hash that identifies a given LREG among the group of individual LREGs.

18. The computer data processing system of claim 17, wherein the at least one valid bit includes a plurality of valid bits, and the combined LREG number further comprises the plurality of valid bits to identify the plurality of individual storage sections in a given LREG among the group of individual LREGs.

* * * * *